P

(12) United States Patent
Parkerson

(10) Patent No.: US 10,418,751 B1
(45) Date of Patent: Sep. 17, 2019

(54) LUG AND TERMINAL ASSEMBLIES, POWER DISTRIBUTION ASSEMBLIES, AND METHODS

(71) Applicant: Siemens Industry, Inc., Alpharetta, GA (US)

(72) Inventor: Jason Parkerson, Mansfield, TX (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 0 days.

(21) Appl. No.: 15/961,963

(22) Filed: Apr. 25, 2018

(51) Int. Cl.
  *H02G 5/00* (2006.01)
  *H01R 13/621* (2006.01)
  *H01R 13/42* (2006.01)
  *H02G 1/14* (2006.01)
  *H02G 5/02* (2006.01)
  *H01R 13/516* (2006.01)

(52) U.S. Cl.
  CPC .......... *H01R 13/621* (2013.01); *H01R 13/42* (2013.01); *H01R 13/516* (2013.01); *H02G 1/14* (2013.01); *H02G 5/02* (2013.01)

(58) Field of Classification Search
  CPC ............ H02G 5/06; H02G 5/025; H02G 1/14; H02G 5/00; H05K 5/00; H05K 5/02; H05K 5/0069; H05K 7/00; H01B 1/026; H01B 7/025; H02B 1/20; H02B 1/205; H02B 1/207; H02B 1/21; H02B 1/22; H02B 1/30
  USPC .......... 174/50, 520, 71 B, 68.2, 88 B, 70 B, 174/91 B, 541; 361/600, 601, 611, 624, 361/637, 648, 679.01, 775
  See application file for complete search history.

(56) References Cited

U.S. PATENT DOCUMENTS

| | | | |
|---|---|---|---|
| 4,740,864 A | 4/1988 | Stanfield et al. | |
| 5,046,173 A * | 9/1991 | Wall, Jr. ................. | H02B 1/056 361/634 |
| 5,295,042 A * | 3/1994 | Midgley .................. | H02B 1/21 361/634 |
| 5,343,356 A * | 8/1994 | Hancock ................ | H02B 1/056 174/68.2 |
| 6,040,976 A | 3/2000 | Bruner et al. | |
| 6,111,745 A | 8/2000 | Wilkie et al. | |
| 6,229,692 B1 * | 5/2001 | Stendardo ................ | H02B 1/04 174/68.2 |
| 6,435,888 B1 | 8/2002 | Reed | |
| 6,603,075 B1 | 8/2003 | Soares et al. | |
| 7,075,021 B2 | 7/2006 | Rowe et al. | |
| 7,329,813 B2 * | 2/2008 | Josten ...................... | H02B 1/14 174/68.2 |
| 7,830,648 B2 * | 11/2010 | Strong ................... | H02G 5/005 174/40 R |
| 8,437,118 B2 | 5/2013 | Kasza et al. | |
| 9,006,571 B2 * | 4/2015 | Manhart .................. | H02B 1/21 174/129 B |
| 9,144,161 B2 | 9/2015 | Kozuru et al. | |
| 9,391,413 B2 | 7/2016 | Blasbalg et al. | |

(Continued)

*Primary Examiner* — Angel R Estrada

(57) ABSTRACT

A power distribution assembly includes a first lug pad electrically coupled to a first phase of a run-over bus and a first cradle including a horizontal portion, a first end having a first vertical portion coupled thereto, and a second end having a second vertical portion coupled thereto. The first lug pad is received on the horizontal portion. A support is coupled to the first vertical portion and one or more braces are coupled to the second vertical portion. Lug assemblies and lug and bus assemblies are disclosed, as are other aspects.

20 Claims, 7 Drawing Sheets

(56) References Cited

U.S. PATENT DOCUMENTS

| | | |
|---|---|---|
| 9,608,413 B2 | 3/2017 | Kubota et al. |
| 9,622,374 B2 | 4/2017 | Bhattacharya et al. |
| 9,705,294 B2 | 7/2017 | Kubota et al. |
| 10,236,664 B2 * | 3/2019 | Zhang .................... H02B 1/30 |

* cited by examiner

LUG AND TERMINAL ASSEMBLIES, POWER DISTRIBUTION ASSEMBLIES, AND METHODS

FIELD

The present disclosure relates to assemblies, systems, and methods for electrical power distribution, and specifically to lug pad assemblies.

BACKGROUND

In power distribution systems (e.g., switchgear and switchboard systems), moving the components as close together as possible minimizes the overall space envelope and enables improved user accessibility. Such close proximity of various buses, such as run-over buses and thru buses can cause movement and/or bending of various components due to large electromagnetic forces present during short circuit events. If such bending is sufficiently large, it is possible to have phase-to-phase contact and/or arcing.

Thus, there is a need for improvements to various bus components to improve user accessibility thereof and allow close proximity thereof.

SUMMARY

According to a first aspect, a power distribution system is provided. The power distribution system includes a first lug pad electrically coupled to a first phase of a run-over bus; a first cradle including a horizontal portion, a first end having a first vertical portion coupled thereto, and a second end having a second vertical portion coupled thereto, the first lug pad received on the horizontal portion; a support coupled to the first vertical portion; and one or more braces coupled to the second vertical portion.

According to another aspect, a power distribution system is provided. The power distribution system includes a first lug pad; a horizontally-extending run-over bus having one or more phases; a first horizontally-extending conductor; and a first lug pad adapter coupled between the first lug pad and a first phase of the horizontally-extending run-over bus, the first lug adapter forming a channel, wherein at least a portion of the first horizontally-extending conductor passes through the channel.

According to another aspect, a power distribution system is provided. The power distribution system includes a first lug pad and a second lug pad. The power distribution system further includes a first cradle including a horizontal portion, a first end having a first vertical member coupled thereto, and a second end having a second vertical member coupled thereto, wherein the first lug pad is received on the horizontal portion; and a second cradle including a horizontal portion, a first end having a first vertical member coupled thereto, and a second end having a second vertical member coupled thereto, wherein the second lug pad is received on the horizontal portion. A support is coupled to the first vertical member of the first cradle and the first vertical member of the second cradle. One or more braces are coupled to the second vertical member of the first cradle and the second vertical member of the second cradle. The power distribution system further includes a run-over bus including a first phase and a second phase, a first horizontally-extending conductor passing through an opening in the support, and a second horizontally-extending conductor passing through the opening in the support. A first lug adapter is coupled between the first lug pad and the first phase of the run-over bus, the first lug adapter at least partially forms a channel, wherein at least a portion of the first horizontally-extending conductor and the second horizontally-extending conductor pass through the channel. A second lug adapter is coupled between the second lug pad and the second phase of the run-over bus, the first lug adapter at least partially forms the channel.

According to another aspect, a method of making a power distribution assembly is provided. The method includes providing a terminal assembly including one or more lug pads; providing a run-over bus including one or more conductors; providing one or more horizontally-extending conductors; and coupling a lug pad to a conductor of the run-over bus using a lug pad adapter, the lug pad adapter at least partially forming a channel, wherein the one or more horizontally-extending conductors are at least partially receivable in the channel.

Still other aspects, features, and advantages of the present disclosure may be readily apparent from the following description by illustrating a number of example embodiments, including the best mode contemplated for carrying out the present disclosure. The present disclosure may also be capable of other and different embodiments, and its details may be modified in various respects, all without departing from the substance and scope of the present disclosure. The disclosure covers all modifications, equivalents, and alternatives falling within the substance and scope of the claims.

BRIEF DESCRIPTION OF DRAWINGS

The drawings, described below, are for illustrative purposes only and are not necessarily drawn to scale. The drawings are not intended to limit the scope of the disclosure in any way. Wherever possible, the same or like reference numbers will be used throughout the drawings to refer to the same or like parts.

DETAILED DESCRIPTION

Reference will now be made in detail to the example embodiments of this disclosure, which are illustrated in the accompanying drawings. Power distribution systems, including switchgears and switchboards, may distribute electric power to a plurality of different systems, locations, and devices. For example, an input of a power distribution system may be connected to a main power line, such as the main power line to a building. The power distribution systems may have circuits and the like that distribute power to a plurality of locations, such as different floors or areas in a building or to different pieces of heavy equipment. Current flow through power distribution systems may be several hundred amperes to 150 kA or greater. In some embodiments, the power distribution systems may monitor current flow to the different locations and may include circuit breakers to disconnect power to locations that draw current in excess of a predetermined amperage.

Power distribution systems may be fabricated in panelized structures that may include a plurality of cabinets or cabinet sections. The front of the panel structures can include user controls, such as circuit breakers, and monitoring devices. In order to conserve space in facilities, the interior of the power distribution systems may be densely packed with controls, buses, circuit breakers, and other components. Cables and associated terminal assemblies that distribute power to different locations are desirably accessible to users from behind the front portions of panel structures. Thus, locations of power distribution systems can be such that they enable user access through the front of the panel structures.

Power distribution systems are disclosed herein in FIGS. 1-3D that enables users to access power distribution components from the front of the panel structures. For example, controls and monitors in addition to cable terminals are accessible from the front of the power distribution cabinets disclosed herein. In addition, the phases of voltages on lug pad assemblies provided to locations external to the power distribution systems may be vertically oriented with A-phase at a top location, B-phase in a middle location, and C-phase at a bottom location, for example.

Figure 1:
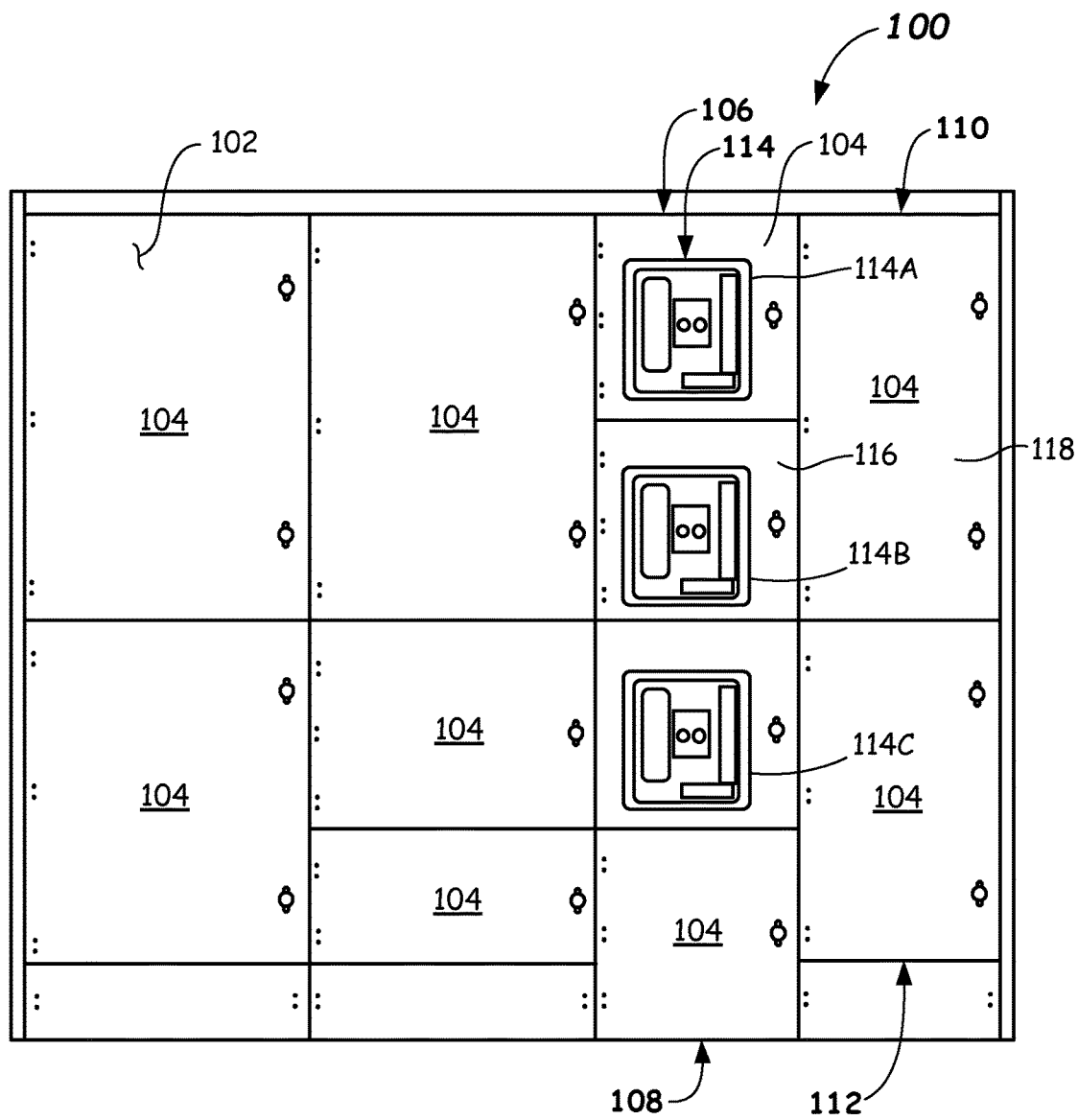
FIG. 1 illustrates a front elevation view of an exterior of a power distribution system (e.g., a switchgear or a switchboard) according to one or more embodiments.

Reference is now made to FIG. 1, which shows a front view of an embodiment of a power distribution system 100. The power distribution system 100 may be a switchgear or a switchboard. The power distribution system 100 may include a front surface 102 including a plurality of panels 104 (a few labeled). A first plurality of panels 106 may include user interfaces 114, which may include controls, such as circuit breakers and other controllers to control and monitor power distribution to different locations. The power distribution system 100 depicted in FIG. 1 includes three user interfaces, referred to individually as a first user interface 114A, a second user interface 114B, and a third user interface 114C. The components within the first plurality of panels 106 may be collectively referred to as the circuit breaker section 108 and may electrically couple to the user interfaces 114. In the embodiment depicted in FIG. 1, the first plurality of panels 106 of the circuit breaker section 108 may be vertically aligned.

A second plurality of panels 110 may contain terminal assemblies, bus assemblies, cables, and the like that electrically connect the power distribution system 100 to locations where power is distributed, such as locations in a building and power equipment. The second plurality of panels 110 can also contain buses carrying line power. These panels are collectively referred to as the cable pull section 112. In the embodiment depicted in FIG. 1, the second plurality of panels 110 of the cable pull section 112 may be vertically aligned. The circuit breaker section 108 may be adjacent or abut the cable pull section 112.

Reference is now made to a panel 116 in the circuit breaker section 108 and a panel 118 in the cable pull section 112, which may be representative of other panels in their respective sections. The panel 118 may be capable of being opened or removed to enable a user access within the cable pull section 112. Terminal assemblies (not shown in FIG. 1) located behind the panel 118 may be electrically connected to cables that provide power to locations and devices as described above. Thus, a user may access the terminal assemblies from the front of the power distribution system 100. The panel 116 may include the second user interface 114B, that can include components such as controls, switches, and circuit breakers, and the like that control and monitor the power distributed via the terminal assemblies located behind the panel 118.

Figure 2A:
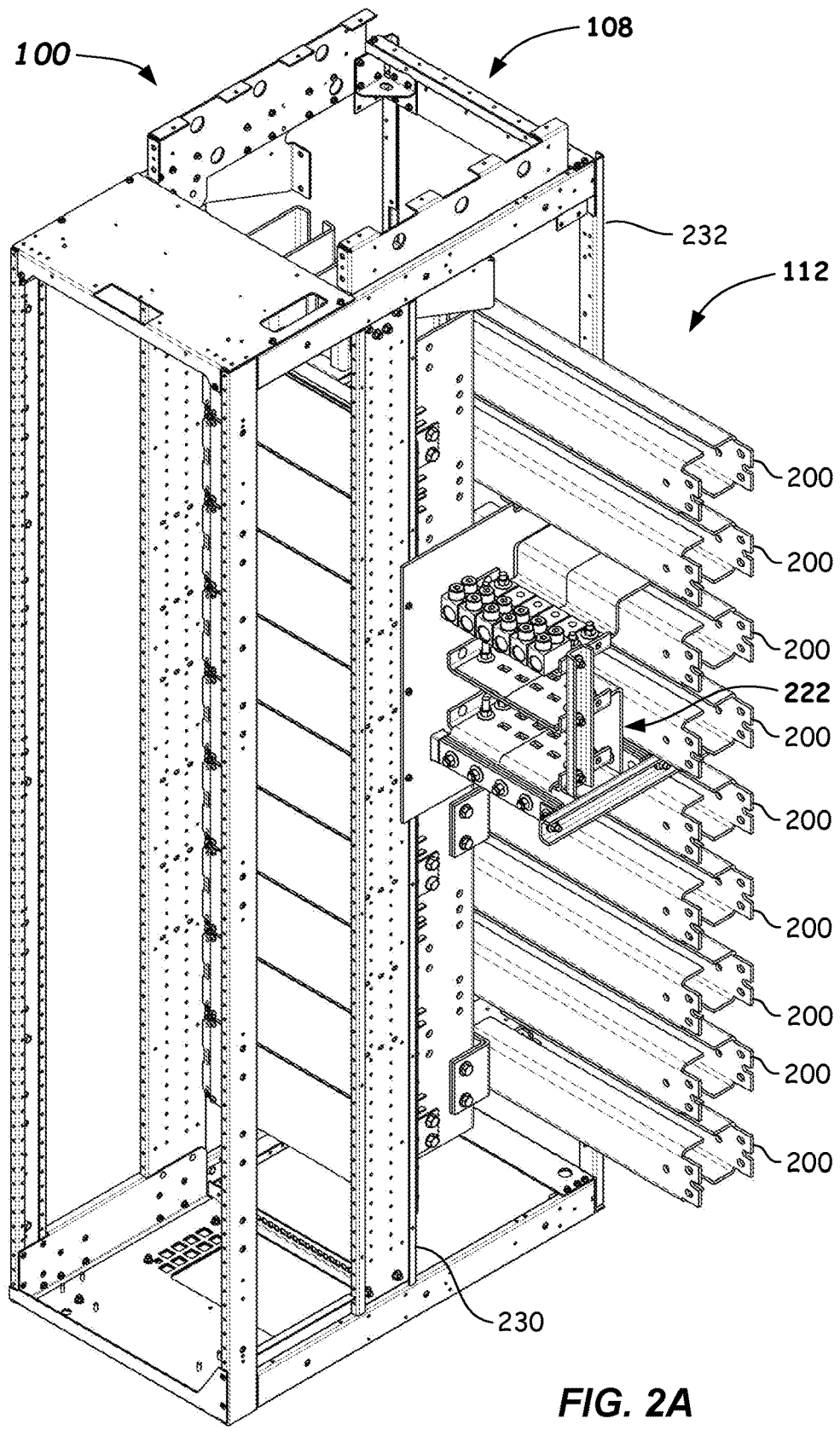
FIG. 2A illustrates an isometric view of a portion of an interior of a power distribution system including horizontally-extending conductors according to one or more embodiments.

Additional reference is made to FIG. 2A, which shows an embodiment of the interior of a portion of the power distribution system 100. The power distribution system 100 may receive three-phase power and distribute the power to the above-described locations and/or components. Received power (e.g., line power) may be conducted within the power distribution system 100 by way of a plurality of horizontally-extending conductors 200 (horizontal buses). The horizontally-extending conductors 200 may be arranged in groups of three corresponding to A-phase, B-phase, and C-phase buses. Each one of the horizontally-extending conductors 200 in a bus may conduct one of the three phases of line power. The embodiment of the power distribution system 100 depicted in FIG. 2A includes nine vertically-aligned, horizontally-extending conductors 200. The horizontally-extending conductors 200 provide three-phase voltage (e.g., A-phase, B-phase, and C-phase) to each of the three user interfaces 114 (FIG. 1) in the circuit breaker section 108. Other embodiments may include fewer or more horizontally-extending conductors 200 and user interfaces. For example, some embodiments include only three horizontally-extending conductors 200 that provide power to all the user interfaces 114. In such embodiments, the plurality of horizontal-extending conductors 200 shows locations where they could be located.

The cable pull section 112 may include one or more terminal assemblies that receive power from the circuit breaker section 108. For illustration purposes, only a single terminal assembly 222 is shown in FIG. 2A. Each terminal assembly may receive power from one of the individual user interfaces 114. In some embodiments, a terminal assembly may receive power from a user interface that is in horizontal alignment with the terminal assembly. For example, the terminal assembly 222 may receive power from the second user interface 114B (FIG. 1), which may be in horizontal alignment with the terminal assembly 222. However, other alignments are possible.

Figure 2B:
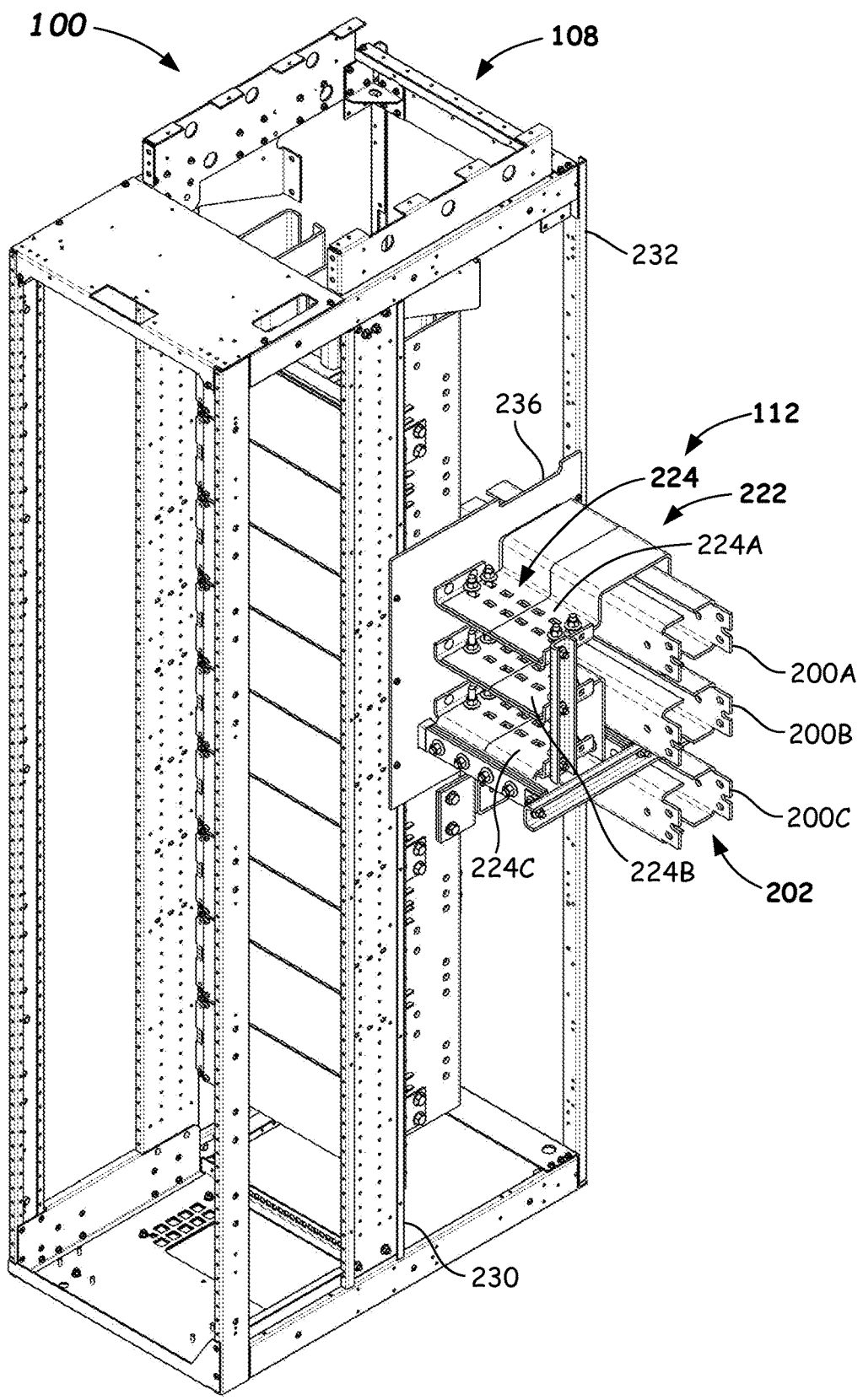
FIG. 2B illustrates the power distribution system of FIG. 2A with all but three of the horizontally-extending bus conductors removed according to one or more embodiments.

Additional reference is made to FIG. 2B, which shows the power distribution system 100 of FIG. 2A including three horizontally-extending conductors 200. The three horizontally-extending conductors shown in FIG. 2B are referred to as a first horizontally-extending conductor 200A, a second horizontally-extending conductor 200B, and a third horizontally-extending conductor 200C. The horizontally-extending conductors 200A-200C may be referred to collectively as a horizontally-extending bus 202. The three horizontally-extending conductors 200A-200C may be in other locations that those shown in FIG. 2B.

The terminal assembly 222 may include a plurality of lug pads 224, wherein individual lug pads conduct individual phases of the power to cables connected to the above-described locations and/or devices that receive power from the power distribution system 100. A first lug pad 224A (e.g., a top lug pad) may conduct a first phase (e.g., A-phase), a second lug pad 224B (e.g., a middle lug pad) may conduct a second phase (e.g. B-phase), and a third lug pad 224C (e.g., a lower lug pad) may conduct a third phase (e.g., C-phase). Thus, the lug pads 224 may be arranged in the terminal assembly 222 so that A-phase is coupled to the first lug pad 224A, B-phase is coupled to the second lug pad 224B, and C-phase is coupled to the third lug pad 224C. This top to bottom configuration of A-phase to C-phase provides ease of use for users installing cables to terminals on the lug pads 224. For example, this configuration may follow common industry practice, which reduces the likelihood that a user will connect a cable to a wrong phase.

The embodiment of the power distribution system 100 depicted in FIGS. 2A and 2B may include several chassis components. For example, a first chassis component 230 and a second chassis component 232 may extend vertically and be positioned at an interface between the circuit breaker section 108 and the cable pull section 112. The first chassis component 230 may be a mid-frame support, whereas the second chassis component 232 may be a rear frame support. A support 236 may be attached to and span between the first chassis component 230 and the second chassis component 232. Supports include structures attached to chassis components within the power distribution system 100 that may or may not be attached to electrical conductors, such as buses. Supports may be made of insulating material in some embodiments. The lug pads 224 may be attached to the support 236 so as to retain the lug pads 224 at fixed locations within the power distribution system 100. The support 236 may be fabricated from an insulating material that is able to withstand the electrical potential between phases of voltage applied to the lug pads 224. The support 236 may also be configured to withstand high electromagnetic forces present during short circuit situations.

Figure 3A:
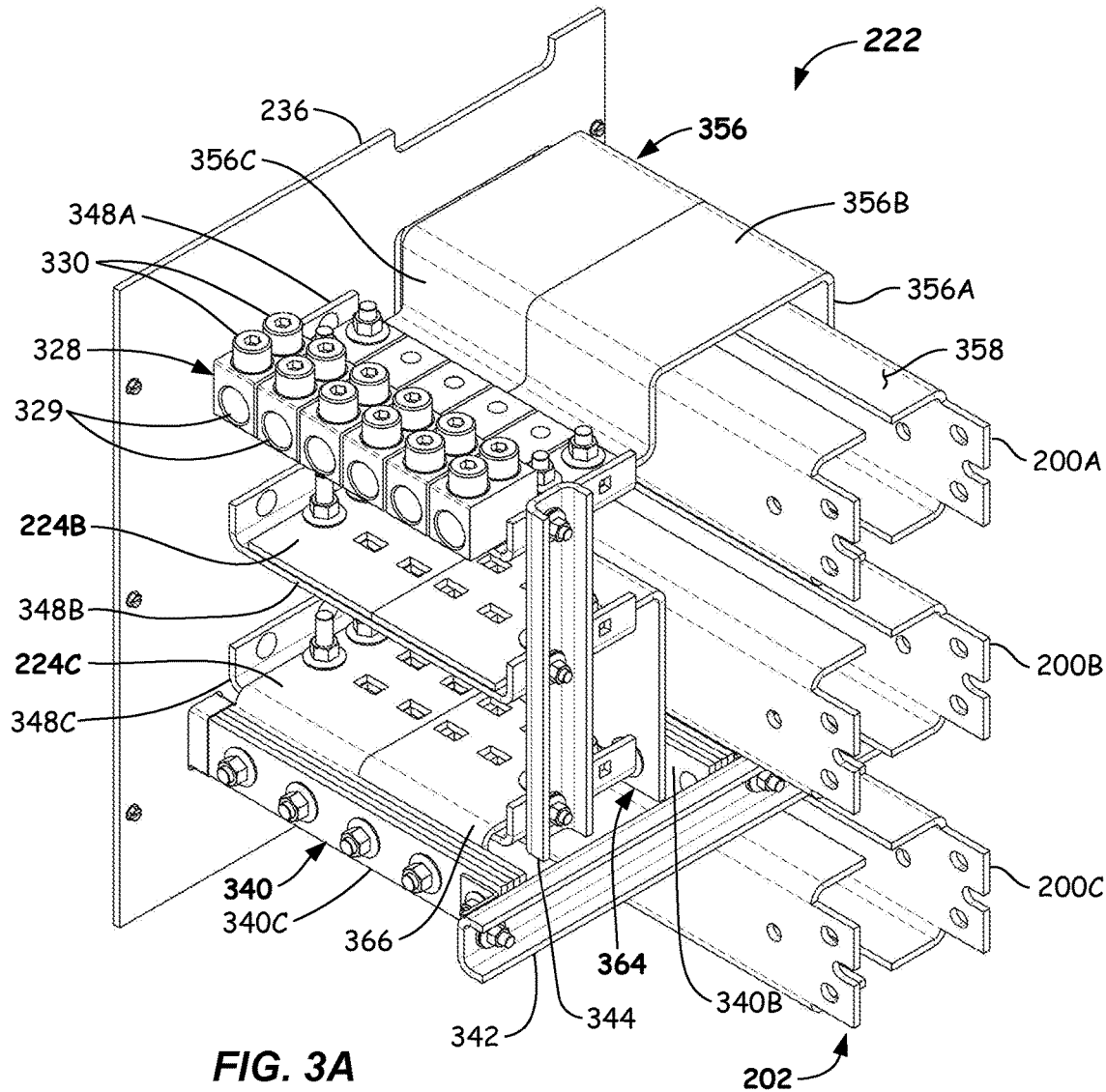
FIG. 3A illustrates a front isometric view of a terminal assembly of a power distribution system according to one or more embodiments.
Figure 3C:
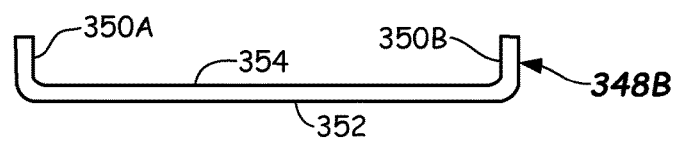
FIG. 3C illustrates a front plan view of a cradle used to support a lug pad in a terminal assembly according to one or more embodiments.
Figure 3B:
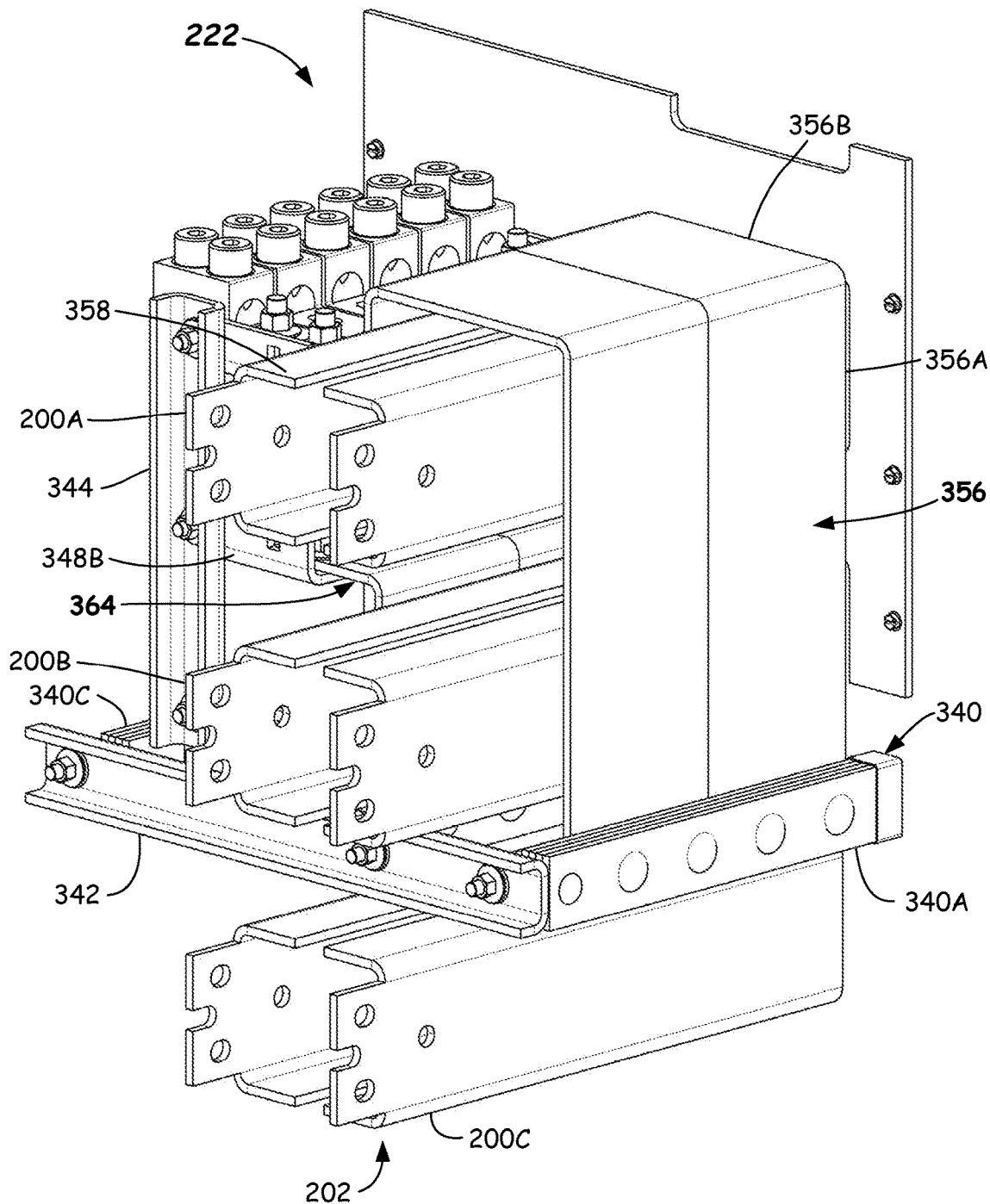
FIG. 3B illustrates a rear isometric view of the terminal assembly of FIG. 3A according to one or more embodiments.
Figure 3D:
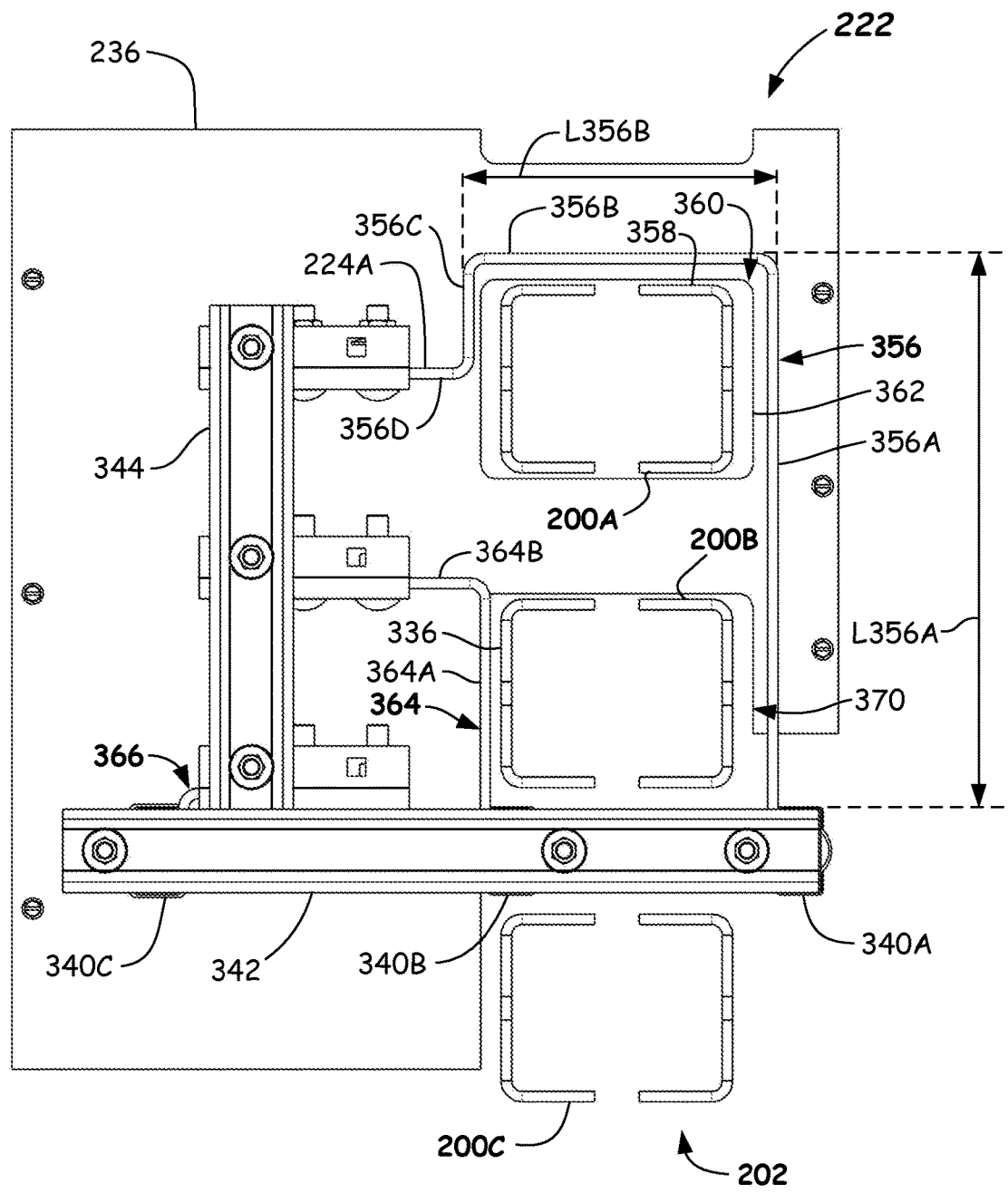
FIG. 3D illustrates a side elevation view of the terminal assembly of FIGS. 3A and 3B according to one or more embodiments.

Additional reference is made to FIGS. 3A, 3B, 3C, and 3D. FIG. 3A shows a front isometric view of the terminal assembly 222. FIG. 3B shows a rear isometric view of the terminal assembly 222. FIG. 3C shows a front elevation view of a cradle that receives a lug pad. FIG. 3D shows a side elevation view of the terminal assembly 222. The three horizontally-extending conductors 200A, 200B, and 200C of the horizontally-extending bus 202 are shown in FIGS. 3A-C extending through the terminal assembly 222. Each individual horizontally-extending conductor 200A, 200B, and 200C may conduct a different phase of power to the user interfaces 114 (FIG. 1). The horizontally-extending conductors 200A, 200B, and 200C in the horizontally-extending bus 202 may conduct other phases to other user interfaces or devices within the power distribution system 100. Although the power distribution system 100 (FIG. 2B) may only have three horizontally-extending conductors 200, all the terminal assemblies may be the same and may be configured to receive horizontally-extending conductors 200 or have horizontally-extending conductors 200 pass therethrough as described herein.

The view of FIGS. 3A, 3B, and 3D show a lug assembly 328 affixed to the first lug pad 224A. Lug assemblies may be affixed to all the lug pads 224, but are removed from the second lug pad 224B and the third lug pad 224C for illustration purposes. The lug assembly 328 may include a plurality of holes 329 (a few labeled) that receive cables (not shown) that distribute power to the above-described locations from the power distribution system 100 (FIG. 1). Screws 330 (a few labeled) electrically couple the cables to the first lug pad 224A.

A run-over bus 340 (only a portion shown) may electrically couple components (not shown) in the circuit breaker section 108 (FIG. 2A) with the lug pads 224. The run-over bus 340 may include a first conductor or A-phase conductor 340A, a second conductor or B-phase conductor 340B, and a third conductor or C-phase conductor 340C. The conductors 340A-340C of the run-over bus 340 may have terminations or otherwise terminate at a brace 342. Braces include devices (e.g., electrically insulating devices) that couple between phases of conductors. Some embodiments of braces do not couple to chassis elements within a power distribution system. The brace 342 may be made from an insulating material and may maintain the conductors of the run-over bus 340 in fixed positions relative to each other within the power distribution system 100 (FIG. 2A). High current flow in the conductors 340A-340C of the run-over bus 340 may cause electromagnetic forces to attract or repel the conductors 340A-340C, especially in a short circuit situation. Thus, the brace 342 may be fabricated so as to withstand the electromagnetic forces on the conductors 340A-340C.

Each of the lug pads 224 (FIG. 2B) may be received in a cradle extending between the support 236 and a brace 344 that may extend vertically. The first lug pad 224A may be received in a cradle 348A, the second lug pad 224B may be received in a cradle 348B, and the third lug pad 224C may be received in a cradle 348C. Reference is made to FIG. 3C, which shows a front view of the cradle 348B and is representative of all the cradles. The cradle 348B may include a first vertical portion 350A and a second vertical portion 350B that may be parallel to the first vertical portion 350A. A horizontal portion 352 may be coupled to both the first vertical portion 350A and the second vertical portion 350B. The horizontal portion 352 may have a surface 354 on which the second lug pad 224B may be received. The first vertical portion 350A may be attached to the support 236 and the second vertical portion 350B may be attached to the brace 344. In some embodiments, the vertical portion 350B may be attached to more than one brace that may extend parallel to the brace 344. In some embodiments, the cradle 348B may be formed from a single sheet of material, such as a single sheet of metal. Lug pads 224A-224C may be received atop the respective cradles 348A-348C, for example.

The power distribution system 100 may include lug pad adapters extending between individual conductors 340A-340C of the run-over bus 340 and individual lug pads 224. The lug pad adapters may be conductors that provide electrical connections between the lug pads 224 and the run-over bus 340. Individual lug pad adapters may be routed within the power distribution system 100 (FIG. 2A) such that they do not electrically contact other conductors within the power distribution system 100. For example, the lug pad adapters may be routed to form one or more channels through which the horizontally-extending conductors 200 may at least partially pass.

Additional reference is made to FIG. 3D, which shows one or more channels formed by the lug pad adapters. A first lug pad adapter 356 may extend between the A-phase conductor 340A and the first lug pad 224A. Accordingly, the first lug pad adapter 356 may conduct the A-phase power from the A-phase conductor 340A to the first lug pad 224A. In some embodiments, the first lug pad 224A and the first lug pad adapter 356 may be formed from a single material, such as a single conductor (e.g., bus bar or conductive sheet metal). The first lug pad adapter 356 may include a first vertical portion 356A electrically coupled to the A-phase conductor 340A and extending vertically above the highest point of the first horizontally-extending conductor 200A, which may be a top side 358. For example, the first vertical portion 356A may have a length L356A, which enables it to extend beyond the first horizontally-extending conductor 200A. In some embodiments, the first vertical portion 356A may be mechanically and electrically coupled to the A-phase conductor 340A of the run-over bus 340. Fastening can be by bolts or the like.

The first vertical portion 356A may be electrically coupled to a first horizontal portion 356B. The first horizontal portion 356B may have a length L356B that is greater than the width of the top side 358 of the first horizontally-extending conductor 200A. In some embodiments, the first horizontal portion 356B is electrically and mechanically coupled (e.g., via being made as one integral component) to the first vertical portion 356A.

The first horizontal portion 356B may be electrically coupled to a second vertical portion 356C that may extend parallel to the first vertical portion 356A. In some embodiments, the first horizontal portion 356B and the second vertical portion 356C are electrically and mechanically coupled together (e.g., via being made as one integral component). The first vertical portion 356A, the first horizontal portion 356B, and the second vertical portion 356C may at least partially form a channel 360 through which the first horizontally-extending conductor 200A may at least partially extend. In embodiments that include only three horizontally-extending conductors 200, the channel 360 may not receive a horizontally-extending conductor, but may be configured to receive a horizontally-extending conductor.

The first horizontally-extending conductor 200A may also pass through an opening 362 in the support 236. The second vertical portion 356C may be electrically and mechanically coupled (e.g., via being made as one integral component) to a second horizontal portion 356D that may couple to the first lug pad 224A. In some embodiments, the second horizontal portion 356D may be integrally formed with the first lug pad 224A. In some embodiments, all portions of the first lug pad adapter 356 may be formed from a single conductor, such as a single piece of sheet metal.

A second lug pad adapter 364 may electrically couple the B-phase conductor 340B of the run-over bus 340 to the second lug pad 224B. Such coupling provides the B-phase of the power from the circuit breaker section 108 to the second lug pad 224B. The second lug pad adapter 364 may include a vertical portion 364A electrically coupled to the B-phase conductor 340B. In some embodiments, the vertical portion 364A is electrically and mechanically coupled to the B-phase conductor 340B, such as by bolts or the like. At least a portion of the vertical portion 364A may extend parallel to a side 336 of the second horizontally-extending conductor 200B. A horizontal portion 364B may be electrically coupled to the vertical portion 364A and may be integrally formed with the second lug pad 224B. The combination of the first lug pad adapter 356 and the second lug pad adapter 364 may at least partially form the channel 360 in which both the first horizontally-extending conductor 200A and the second horizontally-extending conductor 200B extend. The second horizontally-extending conductor 200B may extend through an opening 370 in the support 236. As described above, the channel 360 may not receive horizontally-extending conductors, but may be configured to receive the first horizontally-extending conductor 200A and the second horizontally-extending conductor 200B.

A third lug pad adapter 366 may be coupled between the C-phase conductor 340C and the third lug pad 224C, such as by bolts or the like. In the embodiment of the terminal assembly 222 depicted in FIGS. 3A-3D, the C-phase conductor 340C of the run-over bus 340 may be located closer to the front of the power distribution system 100 (FIG. 2A) than both the B-phase conductor 340B and the C-phase conductor 340C. In such a configuration, the third lug pad adapter 366 does not form a channel or part of a channel through which a horizontally-extending conductor extends.

The configuration of the lug pad adapters can enable the depth of the terminal assembly 222 to be minimized. The minimal depth may provide greater ability to bend load cables (not shown) that provide power to different locations external to the power distribution system 100 (FIG. 1) as described above. In addition, the configuration of the lug pad adapters can enable the phases of the lug pads 224 to extend from A-phase to C-phase in top to bottom vertical alignment. Furthermore, the configuration of the lug adapters can enable the lug pads 224 to be located in the front of the power distribution system 100, so a user can access the lug pads 224 from the front of the power distribution system 100 without having to reach into the power distribution system 100 beyond the lug pads 224.

As shown in FIGS. 3A, 3B, and 3D, the lug pad adapters extend orthogonal relative to the horizontally-extending conductors 200. Therefore, the configuration of the lug pad adapters enables current flow through the lug pad adapters to be orthogonal with current flow through the horizontally-extending conductors 200. Thus, electromagnetic forces between the lug pad adapters and the horizontally-extending conductors 200 can be minimized, which may reduce the likelihood of the lug pad adapters and the horizontally-extending conductors 200A-200C bending into each other and arcing during a short circuit or high current situation.

Referring to FIG. 3D, in some embodiments, the first horizontal portion 356B may couple to or be formed into the first lug pad 224A. For example, the first lug pad 224A and the first horizontal portion 356B may be at the same height, so the second vertical portion 356C is not used.

Figure 4:
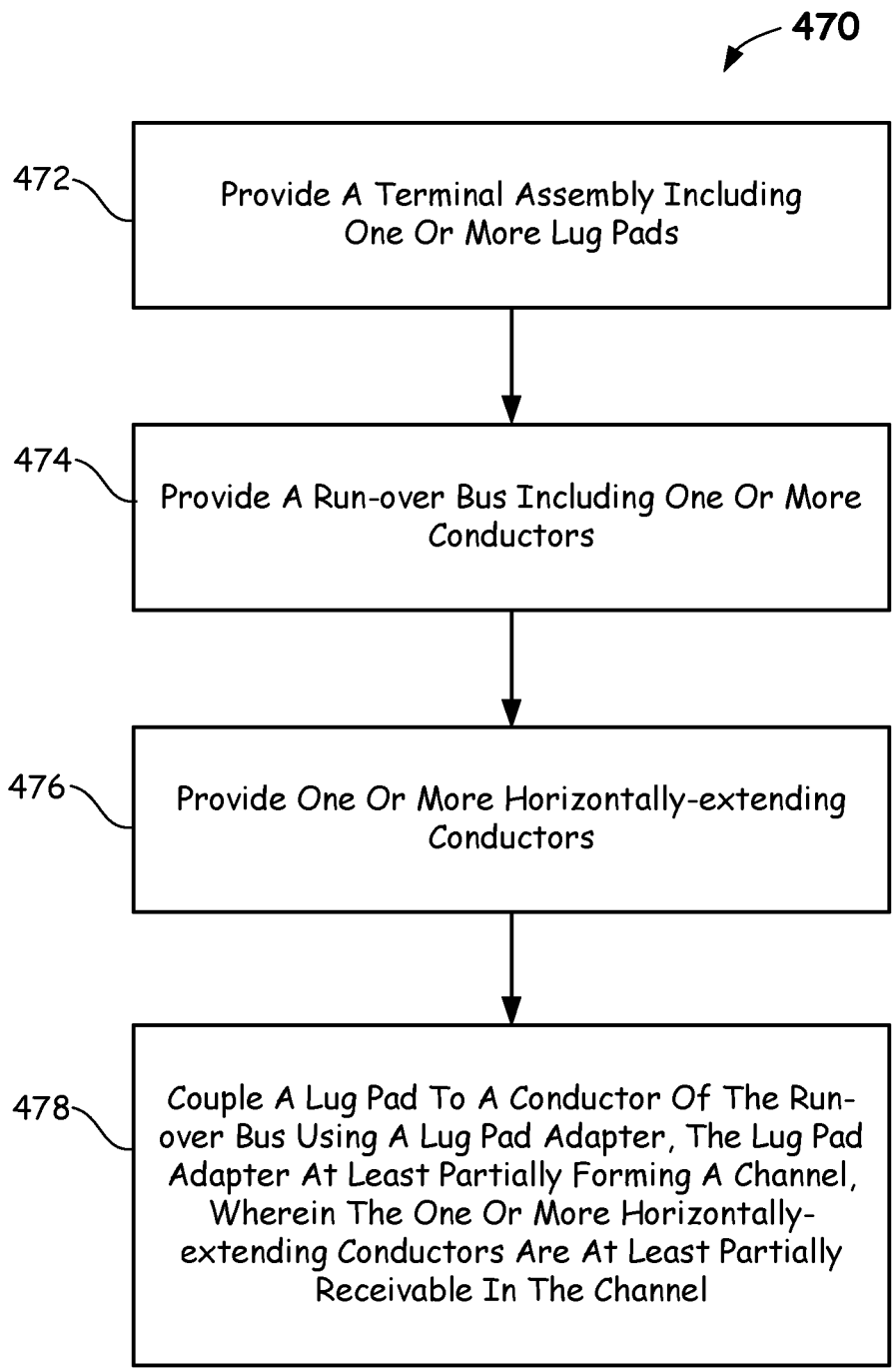
FIG. 4 illustrates a flowchart of a method of operating a power distribution assembly according to one or more embodiments.

FIG. 4 illustrates a flowchart 470 of a method of making a power distribution assembly. The method includes, at 472, providing a terminal assembly (e.g. terminal assembly 222) including one or more lug pads (e.g. lug pads 224). The method includes, at 474, providing a run-over bus (e.g., run-over bus 340) including one or more conductors (e.g., conductors 340A-340C). The method further includes, at 476, providing one or more horizontally-extending conductors (e.g., horizontally-extending conductors 200). At 478, the method includes coupling a lug pad (e.g., lug pad 224A) to a conductor (e.g., A-phase conductor 340A) of the run-over bus using a lug pad adapter (e.g., lug pad adapter 356), the lug pad adapter at least partially forming a channel (e.g., channel 360), wherein the one or more horizontally-extending conductors are at least partially receivable in the channel.

It should be readily appreciated that the present disclosure is susceptible of broad utility and application. Many embodiments and adaptations of the present disclosure other than those herein described, as well as many variations, modifications, and equivalent arrangements, will be apparent from, or reasonably suggested by, the present disclosure and the foregoing description thereof, without departing from the substance or scope of the present disclosure. Accordingly, while the present disclosure has been described herein in detail in relation to specific embodiments, it is to be understood that this disclosure is only illustrative and presents examples of the present disclosure and is made merely for purposes of providing a full and enabling disclosure. This disclosure is not intended to be limiting to the particular apparatus, assemblies, systems and/or methods disclosed, but, to the contrary, the intention is to cover all modifications, equivalents, and alternatives falling within the scope of the claims.

What is claimed is:

1. A lug assembly of a power distribution system, comprising:
   a first lug pad electrically coupled to a first phase of a run-over bus;
   a second lug pad electrically coupled to a second phase of the run-over bus;
   a first lug pad adapter electrically coupled between the first lug pad and the first phase of the run-over bus;
   a second lug pad adapter electrically coupled between the second lug pad and the second phase of the run-over bus,
   wherein the first lug pad adapter and the second lug pad adapter at least partially form a channel configured to receive one or more horizontally-extending conductors;
   a first cradle including a horizontal portion, a first end having a first vertical portion coupled thereto, and a second end having a second vertical portion coupled thereto, the first lug pad received on the horizontal portion;
   a support coupled to the first vertical portion; and
   one or more braces coupled to the second vertical portion.

2. The lug assembly of claim 1, further comprising:
   a second cradle having a horizontal portion, a first end having a first vertical portion coupled to the support, and a second end having a second vertical portion coupled to the one or more braces, the second lug pad received on the horizontal portion.

3. The lug assembly of claim 2, wherein the second cradle is in vertical alignment with the first cradle.

4. The lug assembly of claim 2, further comprising:
   a third lug pad electrically coupled to a third phase of the run-over bus; and
   a third cradle having a horizontal portion, a first end having a first vertical portion coupled to the support, and a second end having a second vertical portion coupled to the one or more braces, the third lug pad received on the horizontal portion,
   wherein the first lug pad, the second lug pad, and the third lug pad are in vertical alignment with each other.

5. The lug assembly of claim 1, wherein the first lug pad adapter includes:
   a first vertical portion coupled to the first phase of the run-over bus to a height greater than the height of a horizontally-extending conductor; and
   a first horizontal portion coupled to the first vertical portion coupled to the first phase of the run-over bus and extending a distance greater than a width of the horizontally-extending conductor,
   wherein the first vertical portion coupled to the first phase of the run-over bus and the first horizontal portion at least partially form a channel configured to receive the one or more horizontally-extending conductors.

6. The lug assembly of claim 5, further comprising:
   a second vertical portion coupled to the first horizontal portion; and
   a second horizontal portion coupled between the first lug pad and the second vertical portion coupled to the first horizontal portion,
   wherein the first vertical portion coupled to the first phase of the run-over bus, the first horizontal portion, and the second vertical portion coupled to the first horizontal portion at least partially form a channel configured to receive the one or more horizontally-extending conductors.

7. The lug assembly of claim 6, wherein the second horizontal portion and the first lug pad are integrally formed.

8. The lug assembly of claim 1, wherein the second lug pad adapter includes a vertical portion coupled to the second phase of the run-over bus and a horizontal portion coupled between the vertical portion and the second lug pad.

9. The lug assembly of claim 1, further comprising a first lug pad adapter electrically coupled between the first lug pad and the first phase of the run-over bus, the first lug pad adapter at least partially forming a channel configured to receive a horizontally-extending conductor.

10. The lug assembly of claim 9, wherein at least a portion of the first cradle is coupled to a support, the support including an opening configured to receive a horizontally-extending conductor.

11. A bus and lug assembly of a power distribution system, comprising:
    a first lug pad;
    a horizontally-extending run-over bus having one or more phases;
    a first horizontally-extending conductor; and
    a first lug pad adapter coupled between the first lug pad and a first phase of the horizontally-extending run-over bus, the first lug pad adapter forming a channel, wherein at least a portion of the first horizontally-extending conductor passes through the channel.

12. The bus and lug assembly of claim 11, further comprising:
    a cradle having a horizontal portion, a first end having a first vertical portion coupled thereto, and a second end having a second vertical portion coupled thereto, the first lug pad being received on the horizontal portion;
    a support coupled to the first vertical portion; and
    one or more braces coupled to the second vertical portion.

13. The bus and lug assembly of claim 11, wherein the horizontally-extending run-over bus has two or more phases, each having a termination, and further comprising one or more braces coupled between each termination.

14. The bus and lug assembly of claim 11, wherein the first lug pad adapter comprises:
    a first vertical portion coupled between the first phase of the horizontally-extending run-over bus and a first end of a horizontal portion; and
    a second vertical portion coupled between the first lug pad and a second end of the horizontal portion,
    wherein the first vertical portion coupled between the first phase of the horizontally-extending run-over bus and the first end of the horizontal portion, the second vertical portion, and the horizontal portion at least partially form the channel.

15. The bus and lug assembly of claim 11, further comprising:
    a second lug pad located in vertical alignment with the first lug pad;
    a second phase of the horizontally-extending run-over bus in horizontal alignment with the first phase of the horizontally-extending run-over bus; and
    a second lug pad adapter coupled between the second lug pad and the second phase of the horizontally-extending run-over bus.

16. The bus and lug assembly of claim 15, wherein the second lug pad adapter forms at least a portion of the channel and wherein a second horizontally-extending conductor at least partially extends through the channel.

17. The bus and lug assembly of claim 11, further comprising:
- a second lug pad located in vertical alignment with the first lug pad;
- a second horizontally-extending conductor in vertical alignment with the first horizontally-extending conductor; and
- a second lug pad adapter coupled between the second lug pad and a second phase of the horizontally-extending run-over bus, the second lug adapter at least partially forming the channel, and wherein at least a portion of the second horizontally-extending conductor passes through the channel.

18. The power distribution system of claim 17, wherein the first phase and the second phase of the horizontally-extending run-over bus each have terminations, and further comprising one or more braces coupled between the terminations.

19. A power distribution assembly, comprising:
- a first lug pad;
- a second lug pad;
- a first cradle including a horizontal portion, a first end having a first vertical portion coupled thereto, and a second end having a second vertical portion coupled thereto, the first lug pad being received on the horizontal portion;
- a second cradle including a horizontal portion, a first end having a first vertical portion coupled thereto, and a second end having a second vertical portion coupled thereto, the second lug pad being received on the horizontal portion;
- a support coupled to the first vertical portion of the first cradle and the first vertical portion of the second cradle;
- one or more braces coupled to the second vertical portion of the first cradle and the second vertical portion of the second cradle;
- a run-over bus including a first phase and a second phase;
- a first horizontally-extending conductor passing through an opening in the support;
- a second horizontally-extending conductor passing through the opening in the support;
- a first lug pad adapter coupled between the first lug pad and the first phase of the run-over bus, the first lug pad adapter at least partially forming a channel, wherein at least a portion of the first horizontally-extending conductor and the second horizontally-extending conductor passes through the channel; and
- a second lug pad adapter coupled between the second lug pad and the second phase of the run-over bus, the second lug pad adapter at least partially forming the channel.

20. A method of making a power distribution assembly, comprising:
- providing a terminal assembly including one or more lug pads;
- providing a run-over bus including one or more conductors;
- providing one or more horizontally-extending conductors; and
- coupling a lug pad to a conductor of the run-over bus using a lug pad adapter, the lug pad adapter at least partially forming a channel, wherein the one or more horizontally-extending conductors are at least partially receivable in the channel.

\* \* \* \* \*